(12) United States Patent  
Chang

(10) Patent No.: US 6,665,465 B2
(45) Date of Patent: Dec. 16, 2003

(54) OPTICAL SWITCH

(75) Inventor: Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 56 days.

(21) Appl. No.: 10/098,324

(22) Filed: Mar. 15, 2002

(65) Prior Publication Data

US 2003/0103719 A1 Jun. 5, 2003

(30) Foreign Application Priority Data

Dec. 5, 2001 (TW) ........................ 90221149 U

(51) Int. Cl.⁷ ................................................ G02B 6/26
(52) U.S. Cl. ........................... 385/22; 385/24; 385/16; 385/17
(58) Field of Search ............................. 385/22, 16–24, 385/27

(56) References Cited

U.S. PATENT DOCUMENTS

| | | | | | |
|---|---|---|---|---|---|
| 4,705,349 A | * | 11/1987 | Reedy | ........................ | 385/16 |
| 5,664,034 A | * | 9/1997 | Mock | ........................ | 385/16 |
| 5,999,669 A | * | 12/1999 | Pan et al. | ..................... | 385/18 |

* cited by examiner

Primary Examiner—Phan T. H. Palmer
(74) Attorney, Agent, or Firm—Wei Te Chung

(57) ABSTRACT

An optical switch (1) in accordance with the present invention includes: a housing (50), an input port (10), a plurality of output ports (11), an optical switching means (20), an indicating device (30) and a driving device (40). The optical switch includes a resistor (37), a fixed reflector (23) and a carrier (21) to which a moveable reflector (25) and a wiper contact (35) are mounted. The wiper contact slides on the surface of the resistor as the carrier moves along a pole (215), changing a resistance provided to a control circuitry. The control circuitry then provides control signals to turn on a light emitting component (31) above the output port which is optically connected with the input port.

9 Claims, 4 Drawing Sheets

OPTICAL SWITCH

BACKGROUND OF THE INVENTION

1. Field of the Invention

The present invention relates to an optical switch, and particularly to an optical switch having an indicating device for indicating an operational state of each output port of the optical switch.

2. Description of Related Art

Optical signals are commonly transmitted in optical fibers, which provide efficient light channels through which optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

In optical fiber systems, various methods have been previously developed for switching optical signals between fiber cables. U.S. Pat. No. 4,705,349 discloses an optical switching device comprising a first port, a second port, a third port, a mounting fixture, a planar mirror and a rotatable table. The mirror is rigidly attached to the rotatable table, which is rotatably mounted upon the mounting fixture. Optical signals are switched among the three ports by selectively rotating the rotatable table. However, no visual indication is provided to an operator showing the operational state of each port of the optical switching device.

For the above reason, an improved optical switch is desired which has an indicating device for indicating an operational state of every output port of the optical switch.

SUMMARY OF THE INVENTION

An object of the present invention is to provide an improved optical switch having an indicating device for indicating an operational state of each output port of the optical switch.

An optical switch in accordance with the present invention comprises a housing, an input port, a plurality of output ports, an optical switching means, an indicating device and a driving device.

The optical switching means includes a base, a carrier, a fixed reflector and a movable reflector. The base defines a receiving slot and a plurality of base holes. The fixed reflector is fixed in the receiving slot and is aligned with the input port. The movable reflector is attached to an upper surface of the carrier. A pole is mounted in the receiving slot of the base. The carrier is mounted to and can move along the pole.

The optical switch further comprises a wiper contact and a resistor. The wiper contact is fixed to the carrier and maintains contact with the resistor, which is fixed relative to the base. The indicating device includes a plurality of light emitting components.

In use, the driving means drives the carrier to a position aligned with a desired output port. A light beam traveling through the input port hits the fixed reflector and is reflected to the movable reflector. The movable reflector directs the light beam to the desired output port. As the carrier moves along the pole, the wiper contact slides along the surface of the resistor and thereby alters the resistance provided in a control circuitry (not shown). As a result, the control circuitry provides control signals which turn on a light emitting component corresponding to the output port.

Other objects, advantages, and novel features of the present invention will become more apparent from the following detailed description when taken in conjunction with the accompanying drawings.

DETAILED DESCRIPTION OF THE INVENTION

Figure 1:
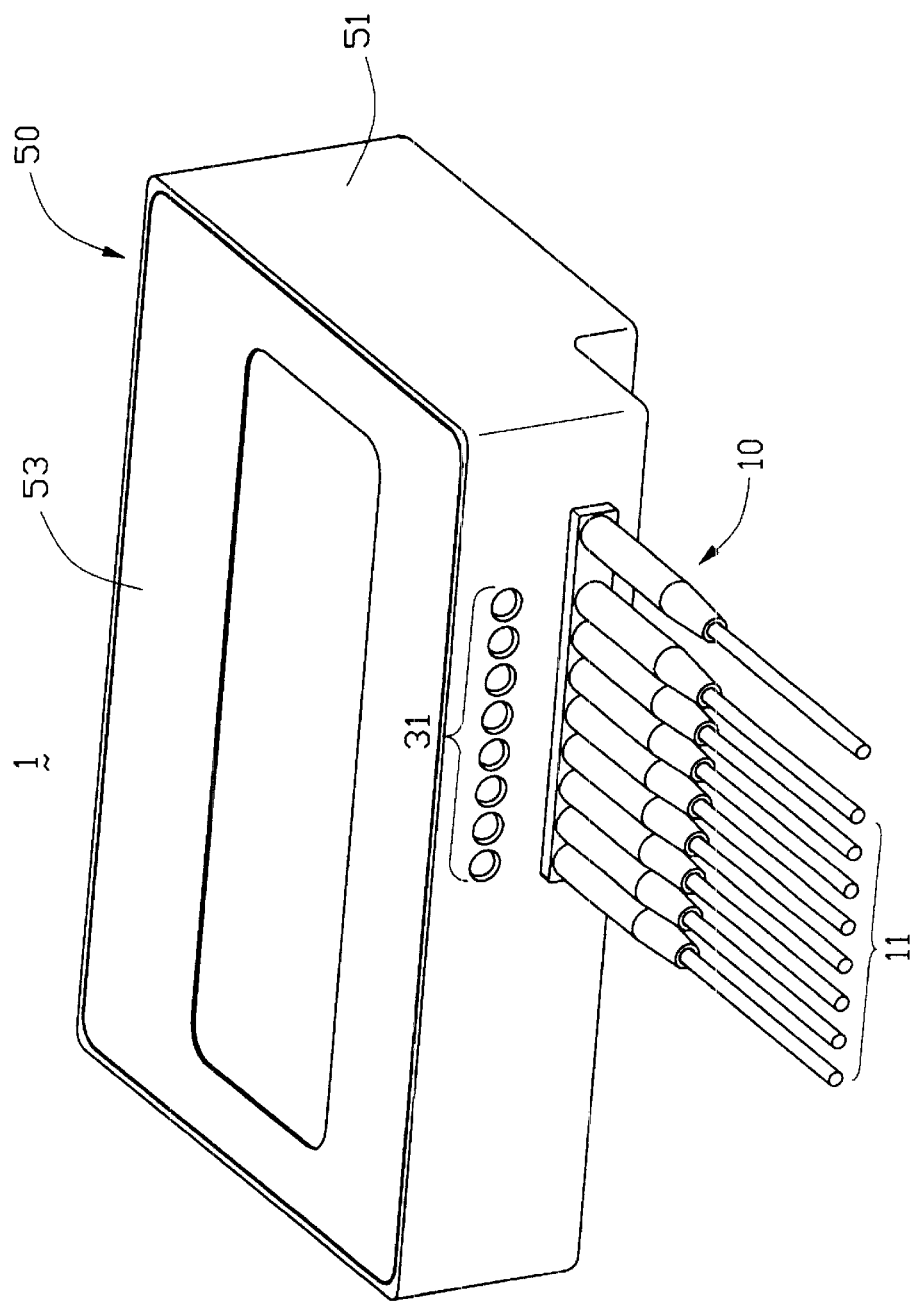
FIG. 1 is an assembled, perspective view of an optical switch according to the present invention.
Figure 2:
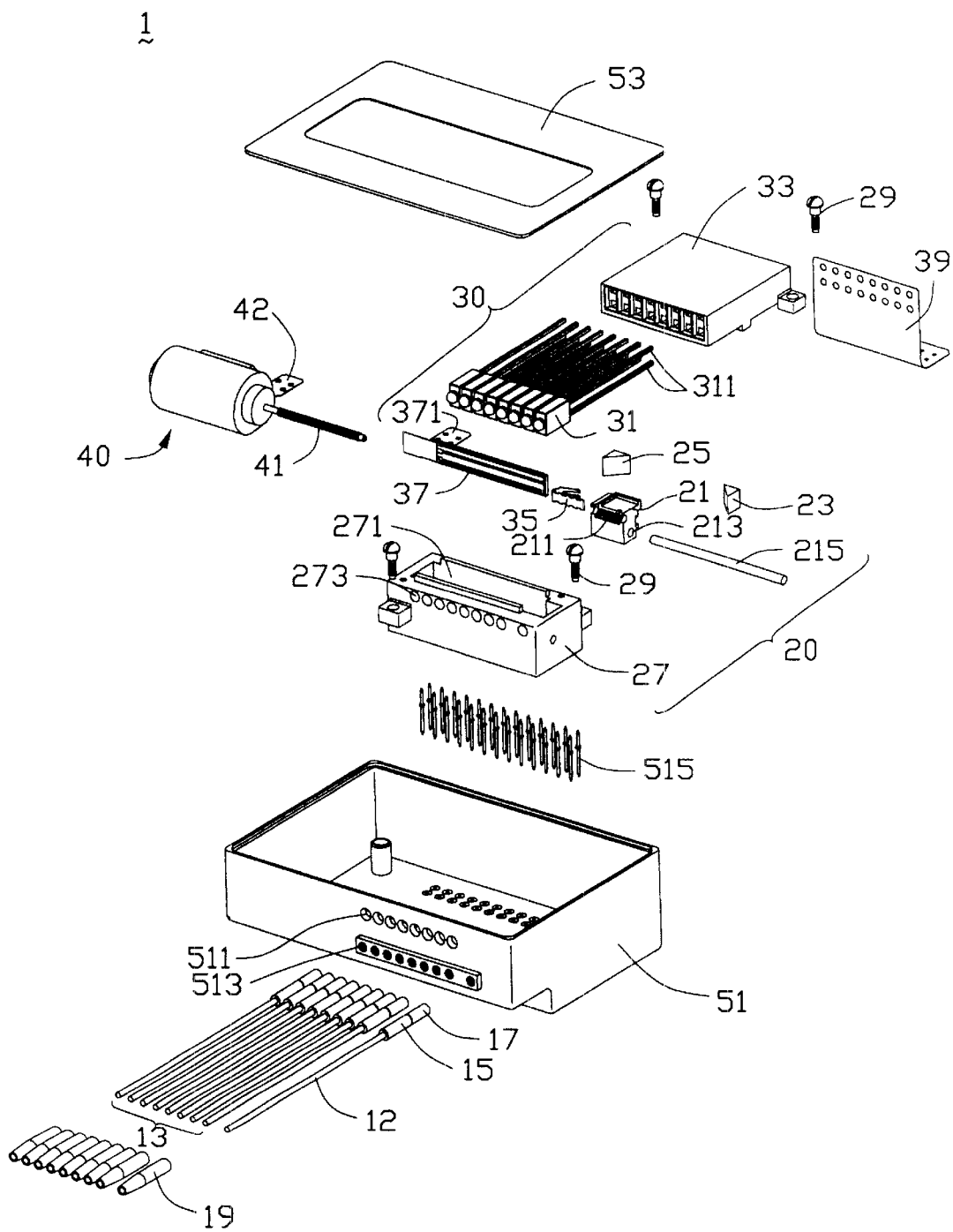
FIG. 2 is an exploded, perspective view of the optical switch of FIG. 1.

As shown in FIGS. 1 and 2, an optical switch 1 comprises a housing 50, an input port 10, a plurality of output ports 11, an optical switching means 20, an indicating device 30 and a driving device 40.

The housing 50 includes a main housing 51, a cover 53, and a plurality of conductive pins 515. The main housing 51 mates with the cover 53 to seal the optical switching means 20, the indicating device 30 and the driving device 40 in the housing 50. The main housing 51 further defines a group of first holes 513, a group of second holes 511, and a plurality of pin holes (not labeled), the pin holes being defined through a bottom (not labeled) of the main housing 51. The pin holes allow passage of the pins 515 through the bottom of the main housing 51, and allow fixture of the pins 515 in the main housing 51.

The input port 10 connects to an input fiber 12 and comprises a ferrule 15, a GRIN (graded index) lens 17 and a strain relief boot 19. The input fiber 12 is fixed to the ferrule 15, and the ferrule 15 is attached to the GRIN lens 17 to collimate optical signals coming from the input fiber 12. The strain relief boot 19 is used to relieve strain on the input port 10 and to keep the input fiber 12 from bending too sharply. The output ports 11 each have a same structure as the input port 10 and collimate optical signals output to the output fibers 13.

The optical switching means 20 includes a base 27, a carrier 21, a fixed reflector 23, a movable reflector 25, and a pole 215. The base 27 defines a receiving slot 271 therein and a plurality of base holes 273 in communication with the receiving slot 271. A concave connecting portion 211 is defined in a front face (not labeled) of the carrier 21 and a plurality of threads (not labeled) is formed on a surface of the connecting portion 211.

The fixed reflector 23 is fixed in the receiving slot 271 and the movable reflector 25 is attached to an upper surface (not labeled) of the carrier 21. The pole 215 fits through a slide hole 213 defined through the carrier 21 and mounts in the receiving slot 271 of the base 27, fitting with side holes (not labeled) defined through each end of the base 27. The carrier 21 therefore fits in the receiving slot 271 and is slidable along the pole 215.

The driving device 40 can be an electric motor and includes a driving shaft 41 and a first tab 42. The driving shaft 41 has screw threads (not labeled) on an outer surface thereof which correspond to the threads of the connecting portion 211 of the carrier 21. The first tab 42 is configured to electrically connect the driving device 40 to pins 515.

Figure 3:
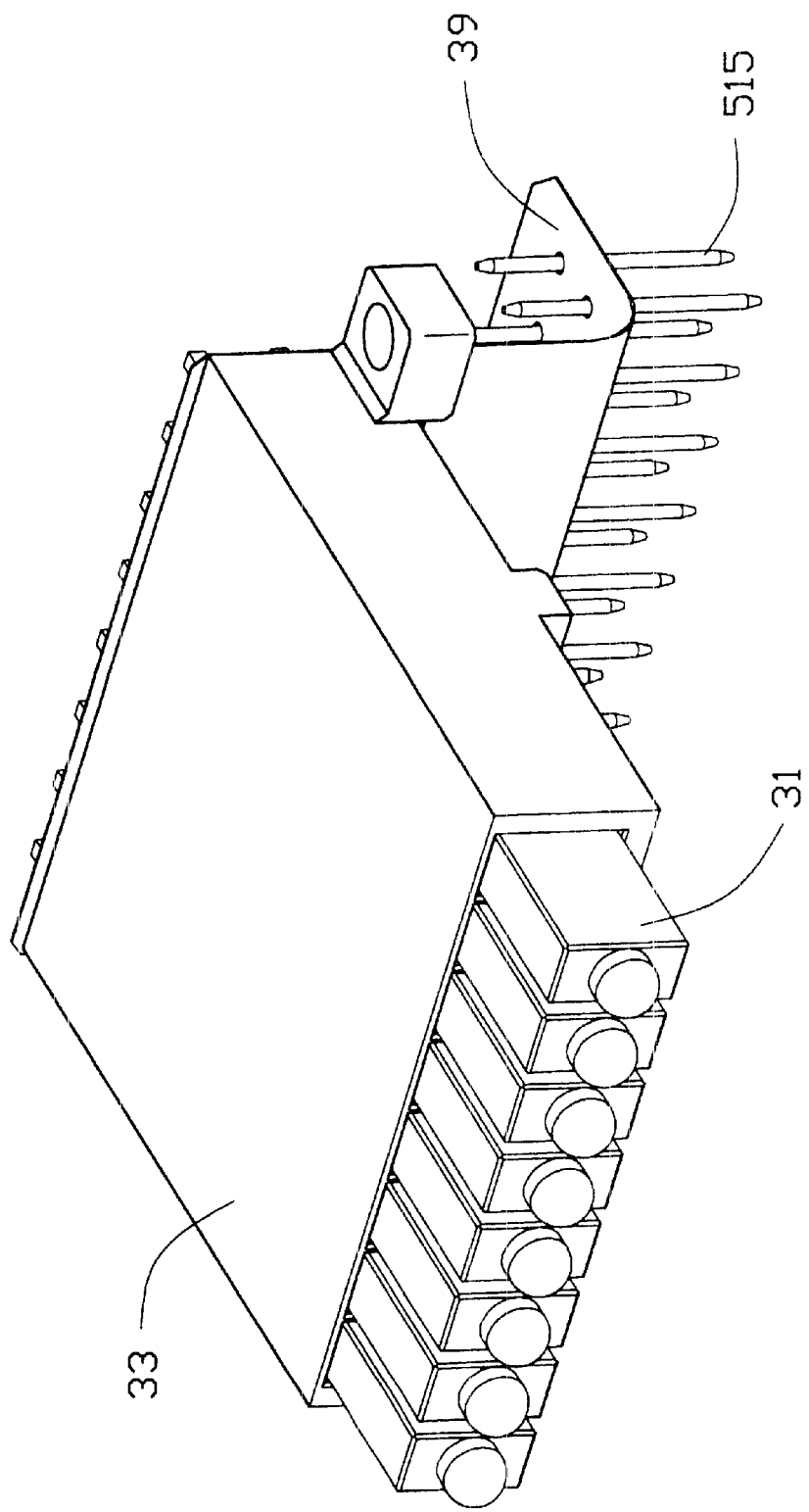
FIG. 3 is an assembled, perspective view of an indicating device of the optical switch of FIG. 1.
Figure 4:
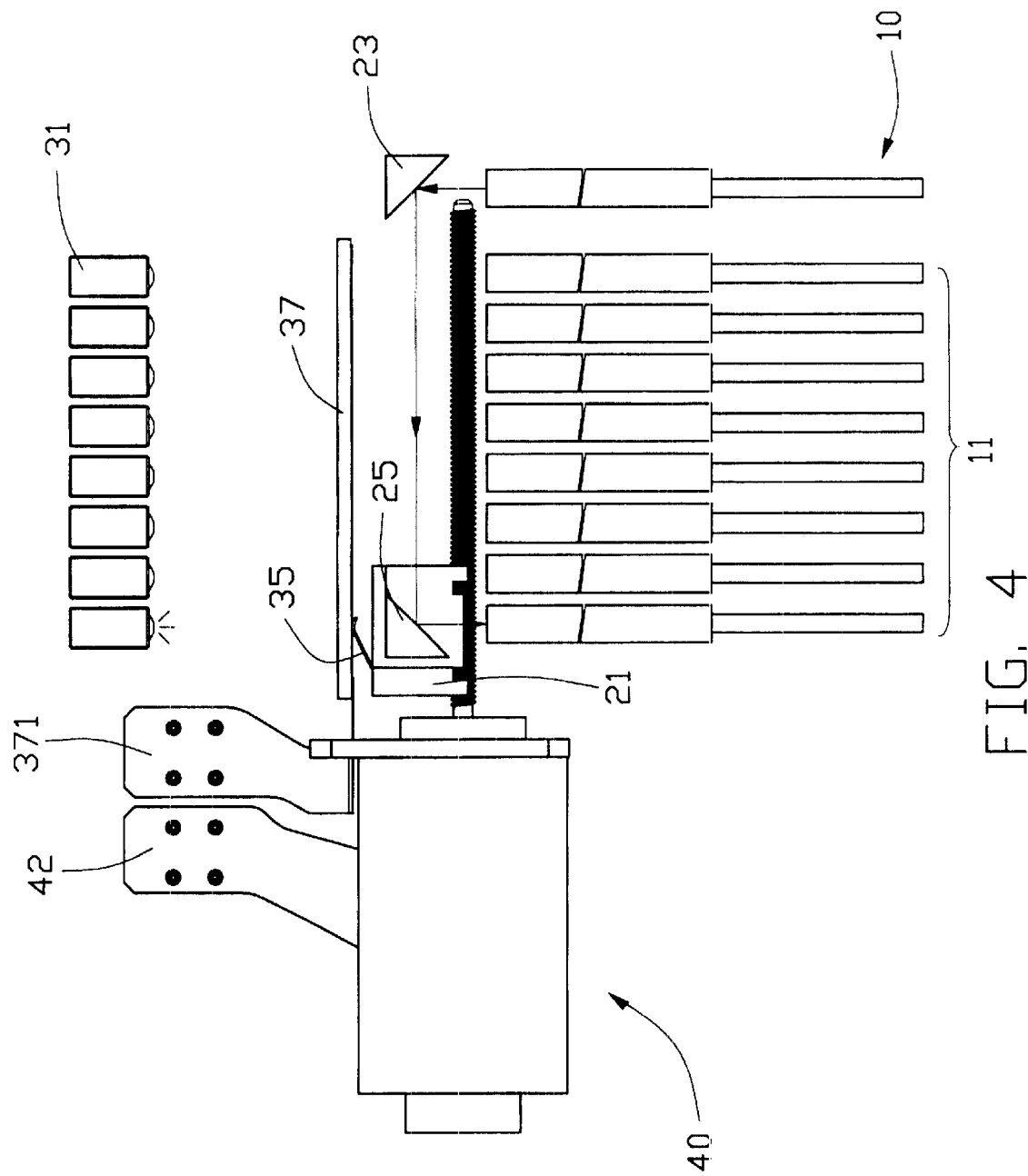
FIG. 4 is a schematic diagram of the operation of the optical switch of FIG. 1.

Also referring to FIG. 3, the indicating device 30 comprises a main body 33, a plurality of light emitting components 31, a flexible printed circuit board 39, a resistor 37, and a wiper contact 35. Each of the light emitting components 31 is mounted in the main body 33 and has two terminals 311 which pass through and engage with holes (not labeled) in the flexible printed circuit board 39, electrically connecting each terminal 311 with the flexible printed circuit board 39. The wiper contact 35 is assembled with the optical switching means 20, attaching to a rear face (not labeled) of the carrier 21 prior to assembly of the carrier 21 into the receiving slot 271. The resistor 37 is also assembled with the optical switching means 20, fitting into the receiving slot 271 of the base 27. The wiper contact 35 maintains electrical contact with the resistor 37 as the carrier 21 slides along the pole 215. The resistor 37 has a second tab 371 configured to electrically connect the resistor 37 to pins 515.

In assembly, the pins 515 are assembled in the pin holes (not labeled) in the bottom (not labeled) of the main housing 51. The driving device 40 is engaged with the optical switching means 20 by inserting the driving shaft 41 through a hole (not shown) in a side wall (not labeled) of the base 27 into the receiving slot 271 so that the screw threads (not labeled) on the outer surface of the driving shaft 41 engage with the threads (not labeled) of the connecting portion 211 of the carrier 21. The connected optical switching means 20 and driving device 40 are then assembled into the main housing 51, with the base 27 being secured with bolts 29 to the main housing 51 and with the first tab 42 and the second tab 371 interengaging with pins 515. The indicating device 30 is then assembled into the main housing 51, with the flexible printed circuit board 39 interengaging with pins 515. The main body 33 of the indicating device 30 is secured in the main housing 51 by bolts 29. Each light emitting component 31 aligns with a corresponding second hole 511. The cover 53 can then be assembled to the main housing 51. The input port 10 and the output ports 11 are each individually received and positioned in one corresponding first hole 513 and in one corresponding, aligned base hole 273. When fully assembled, the input port 10 will align with the fixed reflector 23 in the optical switching means 20.

In use, the driving device 40, through the engagement of the driving shaft 41 with the connecting portion 211, drives the carrier 21 along the pole 215 to a position opposite a desired output port 11. A light beam traveling through the input port 10 is reflected by the fixed reflector 23 to the movable reflector 25, which reflects the light beam to the desired output port 11. Thus, the optical switch 1 can switch the input light beam to any of the output ports 11. As the carrier 21 moves along the pole 215, the wiper contact 35 slides on a surface of the resistor 37, providing a different resistance to a control circuitry (not shown) at each different position where the movable reflector 25 faces a different output port. The control circuitry can thereby determine the position of the carrier 21 according to the different resistances. The control circuitry can then turn on a light emitting component 31 corresponding to the output port 11 aligned with the moveable reflector 25. An operator, therefore, can easily verify the operational state of each output port 11 of the optical switch 1 since the light emitting component 31 corresponding to the optically connected output port will be lit and visible through the corresponding second hole 511 above the transmitting output port 11.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch for switching light signals coming from one input fiber between a plurality of output fibers comprising:
   an input port, the input fiber attaching to the input port;
   a plurality of output ports, an output fiber attaching to each respective output port;
   an optical switching means comprising:
       a fixed reflector for reflecting optical signals from the input port;
       a movable reflector for reflecting optical signals received from the fixed reflector to a selected one of the output ports;
       a variable resistor;
       a carrier for carrying the movable reflector and for carrying a wiper contact which maintains electrical contact with the variable resistor; and
       a base; and
   an indication device having a plurality of light emitting components for indicating an operational state of the output ports;
   wherein the fixed reflector, the movable reflector, the resistor and the carrier are received in the base, the carrier is moveable to a position corresponding to the selected output port and the wiper contact moving with the carrier changes the resistance of the variable resistor, which is connected to a control circuitry, which turns on one of the light emitting components corresponding to the selected output port.

2. The optical switch as claimed in claim 1, wherein the optical switching means further comprises a pole along which the carrier moves.

3. The optical switch as claimed in claim 2, further comprising a driving device for driving the carrier to move along the pole.

4. The optical switch as claimed in claim 1, wherein the wiper contact is made from sheet metal.

5. The optical switch as claimed in claim 1, further comprising a housing having a main housing and a cover.

6. An optical switch comprising:
   an input port;
   a plurality of output ports;
   an optical switching means for switching input light beams from the input port between different output ports; and
   an indicating device; wherein
       the indicating device has a plurality of light emitting components corresponding to the output ports, and the indicating device can indicate an operational state of each of the output ports.

7. The switch as claimed in claim 6, wherein switching means includes a linearly moveable carrier with a reflector thereon and in contact with a variable resistor of the indicating device, and a control circuitry of the indicating device is connected to both said variable resistor and said light emitting components to determine which light emitting component turns on according to the position of the carrier relative to the variable resistor.

8. An optical switch for switching light signals coming from one input fiber between a plurality of output fibers comprising:
   an input port, the input fiber attaching to the input port;

a plurality of output ports, an output fiber attaching to each respective output port;

an optical switching device for switching an input signal transmitting from the input port to one of the output ports; and an indication device having a plurality of light emitting components, one adjacent to each output port, wherein a light emitting component turns on when its corresponding output port is optically connected to the input port.

9. The switch as claimed in claim 8, wherein switching means includes a linearly moveable carrier with a reflector thereon and in contact with a variable resistor of the indicating device, and a control circuitry of the indicating device is connected to both said variable resistor and said light emitting components to determine which light emitting component turns on according to the position of the carrier relative to the variable resistor.

\* \* \* \* \*